(12) United States Patent
Fifield (10) Patent No.: US 7,791,515 B2
(45) Date of Patent: Sep. 7, 2010

(54) ADAPTING FILTER TO DETECTED INTERFERENCE LEVEL

(75) Inventor: Robert Fifield, Redhill (GB)

(73) Assignee: NXP B.V., Eindhoven (NL)

( * ) Notice: Subject to any disclaimer, the term of this patent is extended or adjusted under 35 U.S.C. 154(b) by 476 days.

(21) Appl. No.: 11/718,089

(22) PCT Filed: Oct. 24, 2005

(86) PCT No.: PCT/IB2005/053469

§ 371 (c)(1),
(2), (4) Date: Apr. 26, 2007

(87) PCT Pub. No.: WO2006/046188

PCT Pub. Date: May 4, 2006

(65) Prior Publication Data

US 2009/0135035 A1    May 28, 2009

(30) Foreign Application Priority Data

Oct. 26, 2004  (GB) ................... 0423708.7

(51) Int. Cl.
  *H03M 3/00* (2006.01)
(52) U.S. Cl. ..................... 341/143; 341/139
(58) Field of Classification Search ......... 341/139, 341/143
See application file for complete search history.

(56) References Cited

U.S. PATENT DOCUMENTS

| | | | |
|---|---|---|---|
| 5,179,380 A * | 1/1993 | White | 341/143 |
| 5,786,778 A | 7/1998 | Adams et al. | |
| 6,445,731 B1 * | 9/2002 | Yamano et al. | 375/222 |
| 6,470,365 B1 * | 10/2002 | Rahman et al. | 708/313 |
| 6,693,953 B2 * | 2/2004 | Cox et al. | 375/141 |
| 6,697,438 B2 * | 2/2004 | Doetsch et al. | 375/316 |
| 6,977,978 B1 * | 12/2005 | Jakobsson | 375/350 |
| 2003/0157910 A1 | 8/2003 | Bruckmann et al. | |
| 2003/0207675 A1 * | 11/2003 | Hughes et al. | 455/234.1 |
| 2004/0036637 A1 * | 2/2004 | Singvall et al. | 341/138 |
| 2004/0259510 A1 * | 12/2004 | Audinot et al. | 455/136 |
| 2006/0040617 A1 * | 2/2006 | Haub et al. | 455/67.13 |
| 2006/0055579 A1 * | 3/2006 | Fontaine et al. | 341/155 |
| 2008/0117087 A1 * | 5/2008 | Van Veldhoven | 341/139 |
| 2008/0218392 A1 * | 9/2008 | Van Veldhoven et al. | 341/143 |

FOREIGN PATENT DOCUMENTS

DE    10202635 A1    8/2003

OTHER PUBLICATIONS

"A Low Power Reconfigurable Digital Pulse Shaping Filter for an UTR-TDD Mobile Terminal Receiver" by Veljanovski et al, Australian Telecommunications Cooperative Research Centre.

* cited by examiner

*Primary Examiner*—Howard Williams (57) ABSTRACT

A receiver uses a sigma delta ADC (126) and an adaptable digital filter (132). Detector circuitry detects information about unwanted parts of the signal from an oversampled digital signal, before the filtering, and feeds forward the detected information to the filter, to adapt the filter. By feeding forward the detection information, rather than feeding back an output of the filter, the adaptation can respond much more quickly to rapid changes in the unwanted interference. This enables reduced filtering to save power when interference is low, without risking a sudden increase in interference causing an avalanche of errors before the filter can be adapted correctly. The filter receives the oversampled digital signal combines decimation and channel filtering in one stage.

20 Claims, 9 Drawing Sheets

FIG. 1

PRIOR ART

ADAPTING FILTER TO DETECTED INTERFERENCE LEVEL

This invention relates to circuits with an adaptable filter adaptable according to an amount of an unwanted signal detected in an input, to an integrated circuit and a device having the same.

Figure 1:
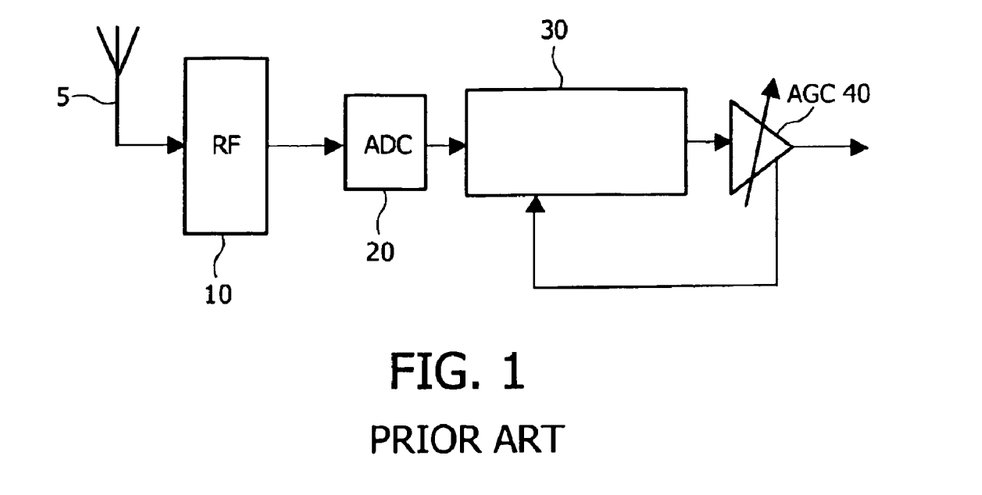
FIG. 1 shows an arrangement of a receiver according to known principles.

Receivers for applications such as mobile phones and other mobile communication devices typically have analogue to digital converters (ADC) and digital channel filter and demodulation functions. Handling such functions in the digital domain can lead to more flexible receiver architectures. A general receiver architecture is shown in FIG. 1. An antenna 5 feeds a radio frequency (RF) front-end 10 which converts the selected channel to an intermediate frequency (IF) (which can be zero). At RF and/or IF there may also be some signal conditioning (for example amplification) and channel filtering (to attenuate neighbouring channels and interferers). In case the signal on the selected channel is too small or too big, an automatic gain control (AGC) circuit 40 can be used to amplify or attenuate the incoming signal to condition it. This can be carried out either after the ADC as shown, in which case the amount of analogue circuitry can be reduced, or before the ADC, in which case the wanted signal can be put at a maximum input level into the ADC, and noise contribution of the ADC can be as low as possible. In the receiver shown, a digital filter 30 is used, fed by ADC 20. The AGC is in the digital domain after the digital filtering.

The AGC needs to be controlled according to an indication of signal strength. This can be detected in the analogue domain in which case it may include unwanted signals, or later in the digital domain after filtering. One example is shown in FIG. 1. The digital AGC part 40 has a Received Signal Strength Indicator (RSSI) output. After the digital filter 30, output power is measured and a RSSI output signal is created which indicates if the input signal of the ADC is too large or not. This kind of AGC arrangement is slow, due to the fact that the signal has to pass the ADC and digital processing first, to be able to detect if the input signal to the ADC is too small or too large.

Another way of setting the AGC, is to measure the input power of the ADC with analogue circuitry. An advantage of this topology is that it can be faster because the input power is measured in front of the ADC. This topology also has a notable disadvantage of needing complicated analogue circuitry.

If the AGC is to be carried out in the digital domain, wider dynamic range is needed for the ADC. It is known to use sigma delta type ADCs to achieve this in mobile receivers, and to provide a digital channel filter after the decimation stage of the sigma delta type ADC.

It is known from US patent application 2003/081706 A1 to improve filtering out of interfering channels in a mobile phone receiver by altering bandwidth of a digital filter based on signal strength. The signal strength is detected by the AGC circuit after the digital filter and fed-back to control the filter. The AGC circuit provides a received signal strength indicator (RSSI) to a variable gain amplifier (VGA) and to a filter control part. The filter control uses the RSSI to control the bandwidth of the digital filter. The filter control signal may be a serial bus interface (SBI) data word or simply an analogue control voltage. The filter control generates the filter control signal to maintain a normal bandwidth for the filter when the RSSI is above a first predetermined threshold. That is, the bandwidth of the filters matches the bandwidth of a filter in a conventional CDMA system. In the presence of a relatively strong received signal, it is desirable to maximize the bandwidth of the signal from the filters to the inputs of ADCs. When the received signal is very low, if the RSSI is below a second predetermined threshold, the filter control signal generated by the filter control sets the filters to a second, narrower bandwidth. The reduction in bandwidth effectively reduces the noise bandwidth and effectively improves adjacent channel rejection. The ADCs can be sigma delta types or other types.

US patent application 2003/0157910 A1 shows a receiver circuit for a mobile radio receiver with a controllable amplifier with a variable gain level, an analogue to digital converter stage, a digital filter configuration for the purpose of channel selection and a signal strength estimator. The signal strength estimator is connected downstream of the filter configuration in the signal path and has the purpose of determining the signal strength in the selected user signal. The amplifier is controlled in dependence on the user-channel signal strength determined by the signal strength estimator It is known from a paper "A low power reconfigurable digital pulse shaping filter for an UTR-TDD mobile terminal receiver" by Veljanovski et al of the Australian Telecommunications Cooperative Research Centre, to reduce power consumption in such a receiver by having an adaptable digital Finite Impulse Response FIR channel filter. The filter length is adapted depending on the amount of adjacent channel interference (ACI) detected at the output of the filter. In band and out of band power is monitored using the output of the channel filter, and fed back to control the filter length. When ACI is low, the number of filter taps used by the FIR filter is reduced. An intelligent controller adjusts the number of taps to use the minimum needed maintain a signal to noise ratio above a given threshold. However this arrangement is not suitable for use with sigma delta ADCs, since the decimation carried out by such ADCs makes it too complex to derive the out of band power.

There remains a need for improved circuits.

It is an object of the invention to provide improved apparatus or methods.

According to a first aspect of the invention, there is provided a circuit comprising an analogue to digital converter (ADC) for converting an input signal to a digital signal, an adaptable digital filter for filtering the digital signal, a detector for detecting information about an unwanted part of the input signal, from the input signal or from the digital signal before the filter, and means for feeding forward the detected information to the filter, the filter being arranged to adapt according to the information.

By feeding forward the detection information, rather than feeding back an output of the filter, the adaptation can respond much more quickly to rapid changes in the unwanted interference. This is because the feed forward avoids the delay as an increase in interference propagates through the digital filter before detection. The feed forward can thus enable reduced filtering to save power when interference is low, without risking a sudden increase in interference causing an avalanche of errors propagating into downstream processing before the filter can be adapted correctly. It also means the detection and filtering can be designed and optimised independently to enable slower filtering or faster or more complete or more efficient detection for example. It can enable the filter to be combined more easily with other circuit functions such as demodulation or equalisation or ADC or AGC for example, and combined with sigma delta ADCs in particular. The information can encompass one or more of: power level, averaged power level, signal level, frequency, RSSI signal, and can be in any format.

As an additional feature for a dependent claim, the input signal comprises many channels, and the digital filter may comprises a channel filter for selecting a desired channel.

As another such additional feature the ADC may comprise a sigma delta ADC having a modulator for outputting an oversampled digital signal, and a decimator. This type of ADC can reduce the need for analogue AGC circuitry, and so lead to more flexible or cost effective systems or lower power consumption for example.

As another such additional feature the digital filter may be arranged to receive the oversampled digital signal and combine the ADC decimator operation and the channel filter operation. This can enable a reduction in overall processing requirement and thus lower power consumption, compared to the conventional arrangement of carrying out the channel filtering after decimation.

As another such additional feature the detector may be arranged to detect the unwanted part of the signal from the oversampled digital signal. This means some of the speed advantage of detecting before digital filtering, can be achieved without all the disadvantages of the complexity of separate analogue detection circuitry.

As another such additional feature the detector may be arranged to detect how frequently a number of sequences appear, corresponding to the unwanted part. This exploits the fact that the modulator of the ADC may output sequences of ones or zeroes, the length of the sequences and period between repeats of the sequences providing information about the frequency and power of parts of the signal, before the unwanted parts are filtered out. This information can be derived with relatively simple circuitry, such as analogue or digital filters or correlators, which need not have high performance in terms of accuracy or output rate. This is useful if much of the detected unwanted parts are blockers in the form of sinusoidal signals. The output of the modulator sigma delta ADC can have a characteristic pattern similar to pulse width modulation. The pattern repeats at the frequency of the blocker and can therefore be detected by a simple correlation for example.

As another such additional feature the detector may comprise circuitry for determining a frequency of the unwanted part. This can help enable the digital filter to be adapted more effectively, to adjust a roll off rate, or a frequency of the roll off.

As another such additional feature is the detector may comprise circuitry for determining information about wanted and unwanted parts of the input signal, and the digital filter being adaptable according to a comparison of the information about the wanted and unwanted parts. This can enable the digital filter to configure itself to improve power efficiency or for other purposes. The wanted signal information may also be used for other functions such as gain control and signal detection.

As an additional feature for a dependent claim, the digital filter may be arranged to carry out a reduced amount of processing when the comparison indicates a strong signal, relative to when the comparison indicates a weaker signal. This can help to reduce power consumption when a strong signal is present.

An additional feature for a dependent claim is the adaptable digital filter being arranged to adapt any of filter order, filter coefficients, and quantisation level. This can enable power consumption to be reduced, and can involve blocking usage of parts of the circuit which affect extremes of a frequency response of the filter, altering a level of attenuation outside the passband, or altering frequency or roll off rate of the passband for example.

Another such additional feature for a dependent claim is circuitry arranged to demodulate a signal operable according to the information. For example such demodulation can be carried out with reduced processing if there is a high signal to noise ratio. Other subsequent circuitry can also be made to operate according to the information.

As another such additional feature the ADC may comprise a noise shaping circuit, and the detector may be arranged to use an output of the noise shaping circuit.

As another such additional feature the noise shaping circuit may comprise two or more series coupled integrator stages, outputs of two or more of the stages being coupled to the detector.

As another such additional feature the detector may comprise circuitry for combining the outputs of the two or more integrator stages so as to give more weight to a preceding one of the stages.

Another aspect provides an integrated circuit having the circuit set out above.

Another aspect provides a mobile battery powered device having the above circuit.

Any of the additional features can be combined together or with any of the aspects of the invention, as would be apparent to those skilled in the art. Other advantages may be apparent to those skilled in the art, especially over other prior art not known to the inventors.

Embodiments of the invention will now be described by way of example, and with reference to the accompanying drawings, in which.

Figure 2:
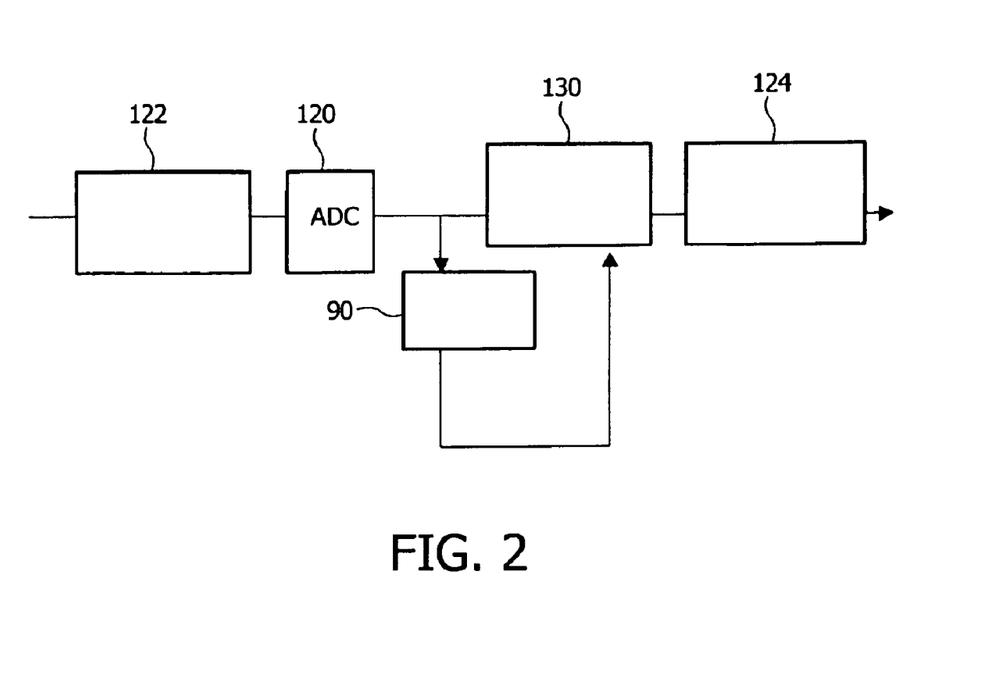
FIG. 2 shows a circuit according to a first embodiment.

A first embodiment is shown in FIG. 2. This shows a circuit having an ADC 120, not necessarily a sigma delta type, and an adaptable digital filter 130. A detector 90 determines a level of interference from outside the desired signal band, and feeds this information forward to the adaptable filter 130. Also shown are other analogue circuitry stages 122 preceding the ADC 120, and other digital processing stages 124 following the adaptable digital filter 130. There can also be other digital processing stages before the adaptable digital filter 130, such as AGC. The arrangement can form part of a wireless receiver, or can be applied to other systems susceptible to changing interfering signals. The information can optionally be fed forward to other subsequent circuit stages such as an equaliser, or a demodulator for example. The amount of processing by these subsequent stages can be adjusted according to the information, to suit different conditions. For example the number of least significant bits used can be changed or a number of stages changed to save power consumption. Also, optionally the detector can be fed from the analogue signal before the ADC. In this case, a relatively simple filter can be implemented in analogue components, or the signal can be converted to digital format and a simple digital filter can be implemented with a relatively low number of coefficients and a relatively low update rate.

By way of introduction to the embodiment shown in FIG. 3, the operation of a sigma delta ADC will be discussed. Sigma delta ADCs can provide a performance benefit in terms of allowing a high dynamic range of signals to be received for a small amount of power consumption. The power advantage of using a sigma delta ADC is only maximised if the digital filter following the sigma delta can be implemented efficiently. The highly over is sampled output of sigma delta converters places extra processing burden into the digital domain resulting in increased power consumption. The analogue side of a sigma-delta converter (a 1-bit ADC) is very simple. The digital side performs filtering and decimation and makes the sigma-delta ADC inexpensive to produce in practice. The principle of operation of the Sigma-Delta Modulator is well known, and need not be described in more detail here. In summary, an input analogue information signal is fed to a feedback loop comprising a continuous-time analogue filter such as an integrator for noise shaping, a sampler and a digital-to-analogue converter (DAC). The output signal of the Sigma-Delta Modulator is a stream of bits at a highly oversampled rate. The oversampled bitstream is fed to subsequent digital processing which converts the bitstream to an accurate digitised representation of the information signal by decimation, with a sampling frequency $F_s$ increased by the oversampling ratio k, to $kF_s$. The oversampling causes the noise floor to drop. The SNR is the same as before, but the noise energy has been spread over a wider frequency range. Sigma-delta converters exploit this effect by following the 1-bit ADC with a digital filter. The RMS noise is reduced, because most of the noise is removed by a digital filter. This action enables sigma-delta converters to achieve wide dynamic range from a low-resolution ADC. By summing the error voltage, the loop filter in the form of an integrator function, acts as a lowpass filter to the input signal and a highpass filter to the quantisation noise. Thus, most of the quantisation noise is pushed into higher frequencies where it is removed by digital filtering. Oversampling and integrating has changed not the total noise power, but its distribution.

The digital filter averages the 1-bit data stream, improves the ADC resolution, and removes quantisation noise that is outside the band of interest. It determines the signal bandwidth, settling time, and stopband rejection. An example of a filter topology for the digital lowpass function is the $Sinc^3$ type.

Figure 3:
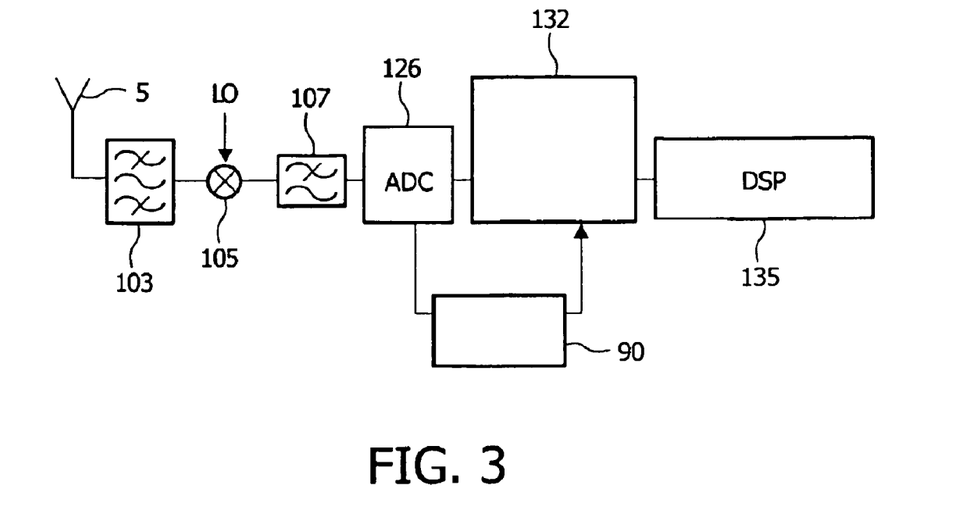
FIG. 3 shows a receiver according to another embodiment.

In FIG. 3, a receiver is shown having an adaptable digital filter 132 and a sigma delta ADC 126. As in FIG. 2, a detector 90 provides the information to adapt the digital filter 132. In this case the adaptable digital filter 132 combines the decimation function for the ADC 126 and the channel filter function. This can be implemented in an ASIC (application specific integrated circuit) or FPGA (field programmable logic array) type circuit, or can be carried out by a DSP (digital signal processor), as desired. In this example, a DSP 135 is provided for subsequent digital processing such as demodulation, equalisation and so on.

The receiver includes an antenna 5, and analogue circuitry including an RF filter 103, followed by a mixer 105 for mixing a local oscillator signal LO. An analogue low pass filter 107 is followed by the sigma delta type ADC 126. This feeds a digital signal to the adaptable digital filter 132, which is adapted according to the unwanted signal information, to adapt the channel filter function to optimise it for power efficiency.

The detector 90 can be much simpler than the adaptable digital filter 132, to save power or reduce complexity. An example is described below with reference to FIG. 7. Notably, the adaptation of the digital filter processing can be relatively autonomous, in other words independent of higher levels of software controlling a system or applications using the circuitry, and so need not add complexity to the interface to such software. The detection information can include one or more of: power level, averaged level, frequency, frequency range, comparison to a threshold, comparison to a wanted part of the signal, combinations of these and so on.

Figure 4:
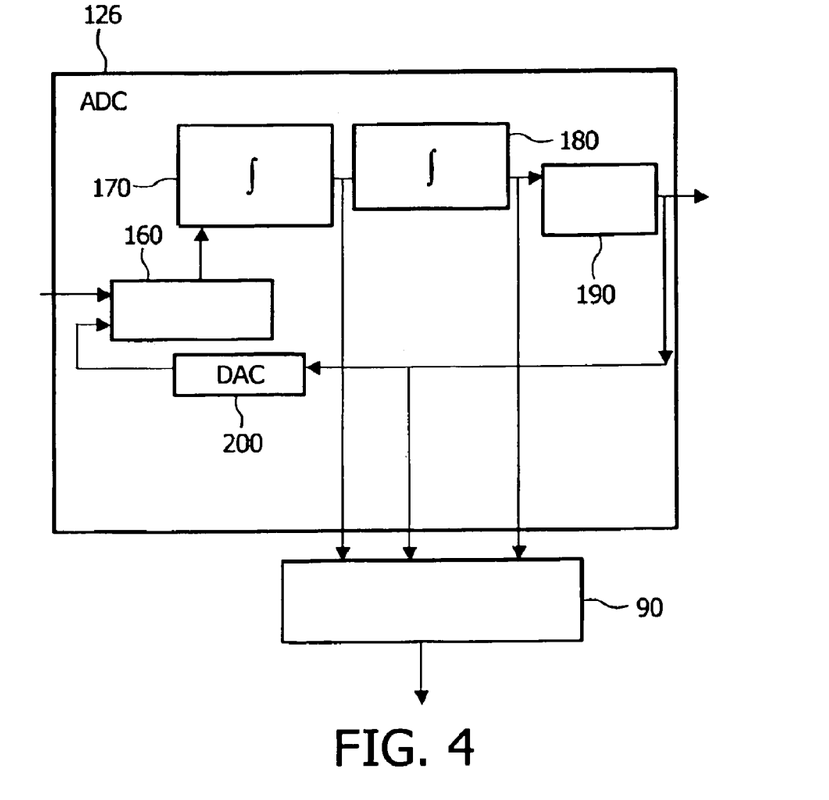
FIG. 4 shows a view of an ADC for use with the arrangement of FIG. 2 or 3.
Figure 5:
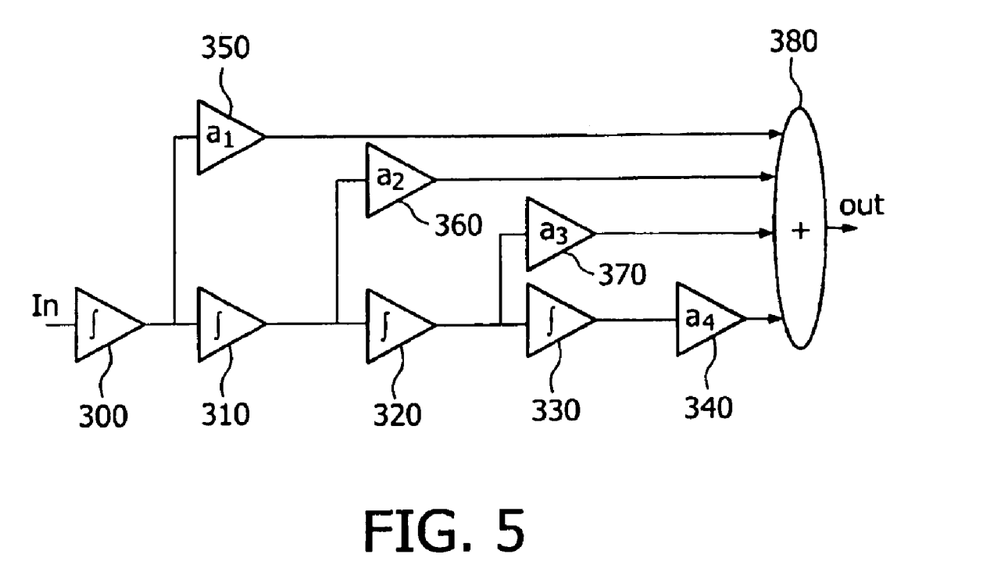
FIG. 5 shows a view of an ADC and a digital filter which can combine decimation and channel filtering, according to an embodiment.
Figure 6:
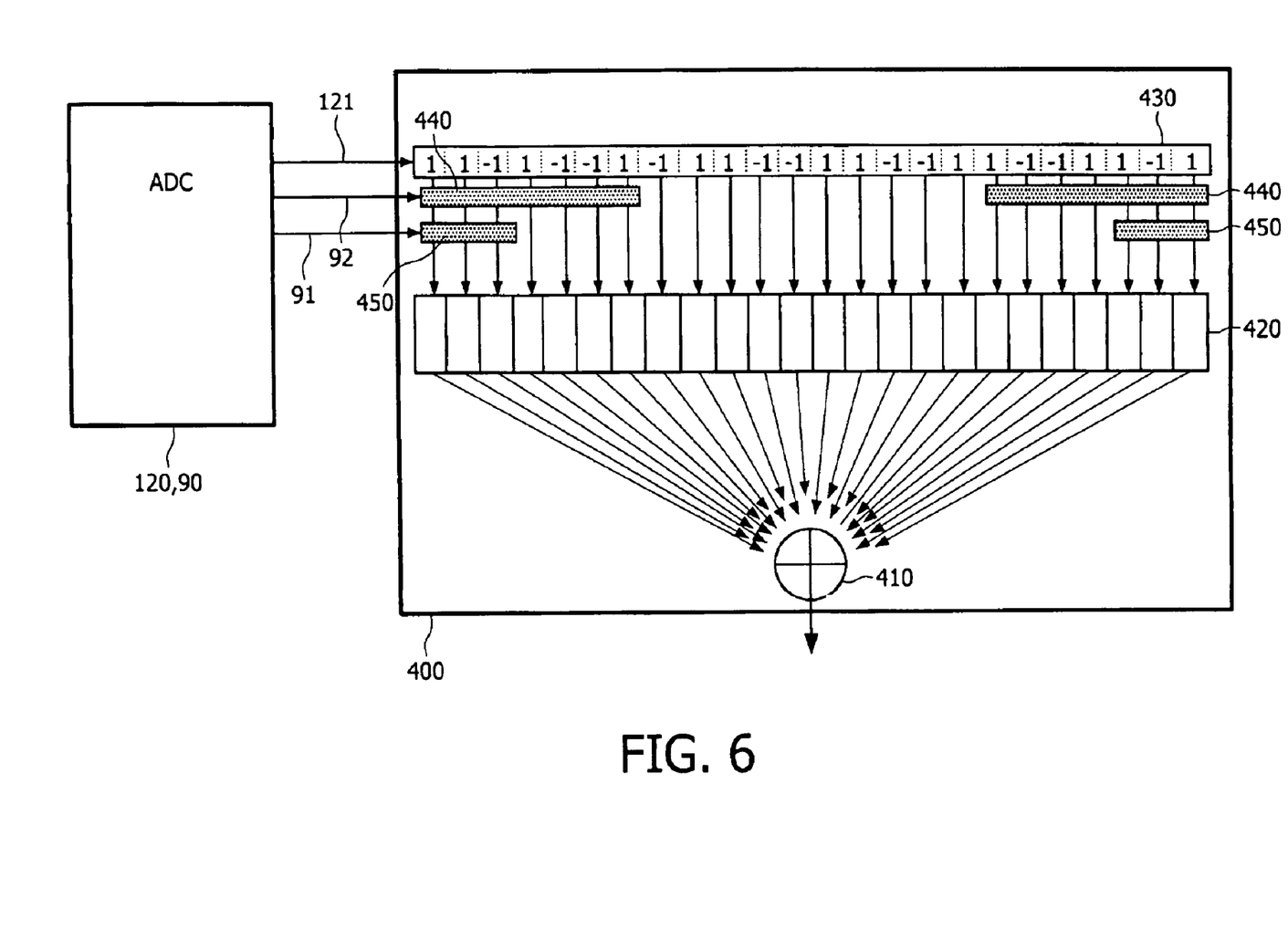
FIG. 6 shows a view of an integrating filter, ADC and detecting circuit for use with the arrangement of FIG. 4.

More detail of an example of how the sigma delta ADC 126 can be implemented is shown in FIGS. 4 and 5. More detail of an example of how the channel filter and decimation functions can be implemented is shown in FIG. 6. In FIG. 4, The ADC 126 includes at least a subtractor 160 feeding a loop filter for noise shaping, comprising multiple integrator stages; two are shown, a first stage 170 and a second stage 180, but more are typically used. Another example of this loop filter is shown in FIG. 5 described below. The output of the integrator stages 170, 180 is fed to a sampler 190. This outputs the oversampled 1 bit data stream. This is fed to the digital processing part 132 for filtering and decimating. This is a separate function to the channel filtering and signal detection shown in FIG. 3, though they can be carried out by the same hardware or combined in a single filtering operation. The decimation normally needs an initial low pass filter for anti aliasing purposes. The channel filter can be a band pass function, but for the receiver of FIG. 3, the IF. circuitry has moved the desired signal to the lowest frequencies so the channel selectivity can be a low pass filter. There is also a feedback path to the other input of the subtractor 160, via a digital to analogue converter (DAC) 200.

The sigma delta ADC 126 in this case provides outputs to the detection circuitry 90 for determining signal power information. This part measures signal power from the outputs of the internal integrators of the ADC 126. This can be arranged to enable the detector to recognise three different signal levels: low power (no signals asserted) mid power (the mid power signal is asserted) and high power (the high power signal is asserted). These signals are input to the channel filter 132 where they are used to adapt the digital circuitry.

The loop filter for noise shaping (in the example of FIG. 5 it is 4th order) consists of integrators, comparators and feed forward coefficients. The number of integrators determine the order of the noise shaping. The feed forward coefficients are used to help make sure that the transfer function is first order at high frequencies to ensure loop stability. There can also be clip levels or limits to help make sure that if the ADC is overdriven, the output signals on the integrators are limited to an upper and lower level. This is to avoid large signal instability of the sigma delta modulator. In the example shown in FIG. 5, there are four integrator stages 300, 310, 320, and 330 coupled in series. As well as feeding a final output to the sampler, the outputs of the comparators are digital logic signals and are fed to combinatorial or time averaging logic circuitry 380 which outputs the signal power information.

To implement such RSSI in this ADC, the output of each integrator stage is individually fed to comparators 350, 360, 370, 340 for comparison to a reference, as determined by a feed forward coefficient, which is chosen in such a way that the sigma delta modulator has not started to clip yet. If the integrator output level exceeds the reference level an RSSI bit is set. The number of bits set, (set by the different comparators) indicates how severe the ADC is overdriven. The RSSI output can be formed by combining the bits set in various ways. The RSSI output bit can be used to adapt the digital filtering and set the AGC and avoid ADC overload for example. The combination of the (in this case 4) bits can for example be done by a simple AND gate. When the output of the AND gate is a logic "1", this means that the ADC is likely to be overdriven.

Another way to generate the RSSI, is to combine the bits in a weighted way. Because the sigma delta converter coefficients are designed in such a way that if the sigma delta converter is overdriven, the last integrator is clipping first, the second last integrator is clipping second, and so on, and in this way the converter gracefully degrades in performance. If a stage starts clipping, it distorts the internal signals of the sigma delta ADC loop. The degradation in performance of the sigma delta ADC loop as a whole, is the lowest when the 4th integrator is clipping, and worst for the first integrator. This is because the 4th integrator is at the end of the loop filter, which means that there is more gain in front of the 4th integrator. The errors made here are shaped (like the quantisation noise) by the part of the loop filter which is still working properly. By using weighted RSSI, the RSSI information coming from the first integrator can be made more important compared to the RSSI information coming from the 4th integrator.

In FIG. 6, the ADC and detecting circuit 120, 90 outputs a digital data signal 121, and digital power information signals indicating mid power 91 and high power 92, to the digital circuit 400. The digital circuit can include many functions, here only the digital filter functions are shown. The filter is arranged to be adapted by the power information signals. The filter includes a shift register 430 for converting the serial data into parallel form for feeding to a number of multipliers 420, which multiply the data (shown as 1-bit data for conciseness) by stored filter coefficients. The results output by the multipliers are added by adder 410, and output.

In this example, the adaptation involves stopping the operation of, or powering down parts of, the filter which are at the extremes of the filter response. In FIG. 6 this is done by blocking the input data values before they are multiplied by the filter coefficients. This can involve switches 440, 450 for switching off some of the multipliers at either end of the array of multipliers. A smaller number of switches 450 are coupled to a mid power signal, and a larger number of switches 440 are coupled to a high power signal. In this way the pass band & stop band frequencies can remain the same but the stop band attenuation is somewhat degraded. Other digital filters, or other digital functions can be used and adapted by the power information, to reduce power consumption or improve performance, to reduce memory or processing load, or improve filtering performance for example, as desired.

A further method of reducing the power consumption is to use the sigma delta signal power information to adapt how many bits are used in the filter coefficients. This can reduce the complexity of subsequent arithmetic and save power or save computation time or computation resources.

Advantages over the normal procedure include:

1) Receiver power consumption can be optimised for different input signal conditions 2) The decision about when to switch into and out of a power saving mode is independent and therefore invisible to higher layer control. This reduces the complexity of interfaces and makes our solution more attractive.

One disadvantage over the normal procedure is that detection of a high power in the sigma delta ADC could either be a strong wanted signal, or a strong interferer or a blocker. If it is an interferer or blocker it is useful to retain enough filter attenuation to reject these signals. This is feasible for adjacent channel interference because the difference in powers is not too great. For blockers particularly in GSM where a 3 MHz blocker must be highly attenuated, this problem can be solved by observing the data output of the sigma delta ADC. When a large sinusoid is being received the output of the sigma delta ADC has a characteristic shape that looks like pulse wave modulation. This modulation repeats at the frequency of the blocker and can therefore be detected by a simple correlation.

Figure 7:
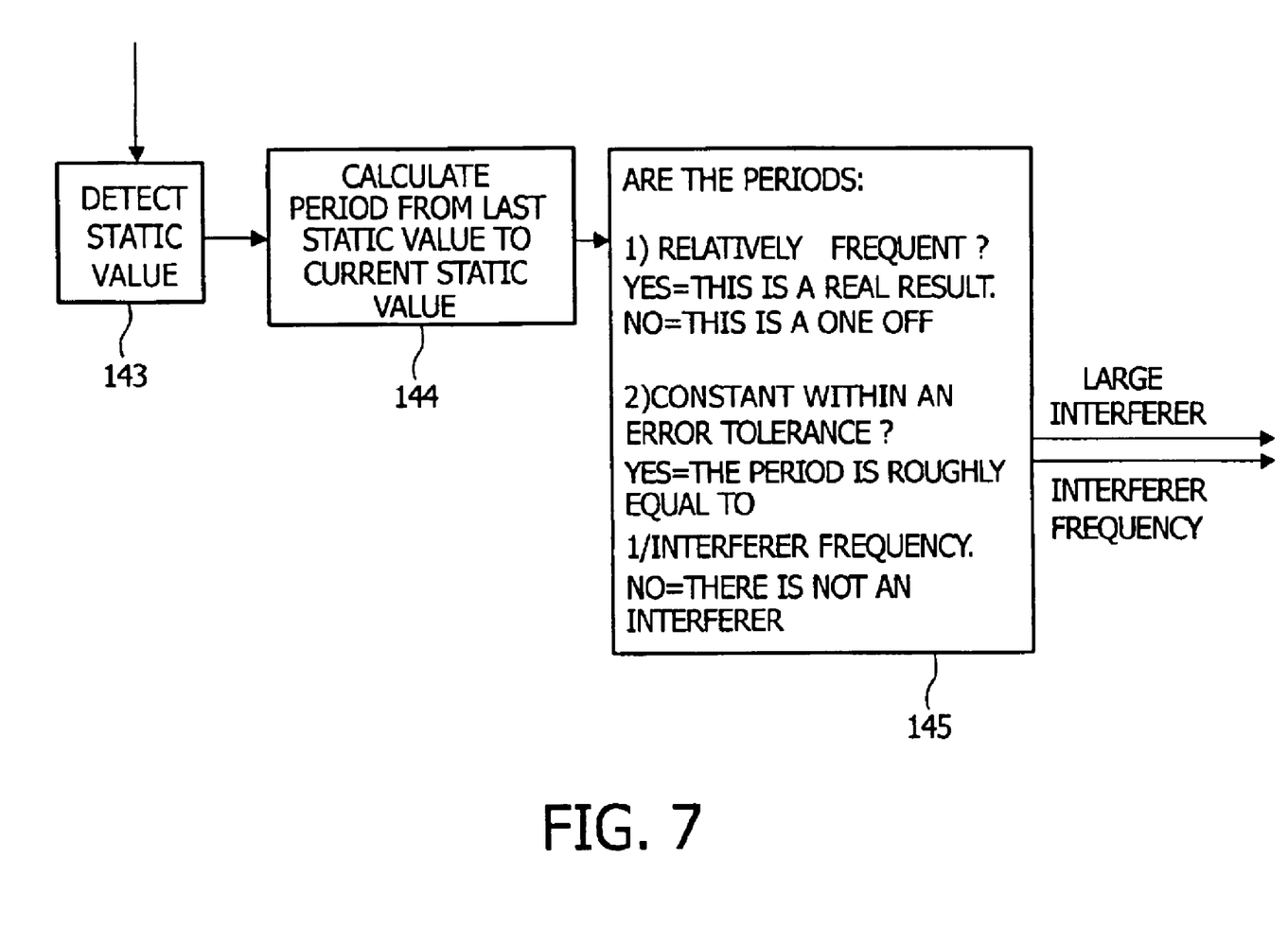
FIG. 7 shows a view of some of the functions of the detection circuit.

FIG. 7 shows a schematic view of some of the principal functions of parts of a detector 90 suitable for determining information about an unwanted part of a signal (also called blocker detection). This uses as an input, the over sampled digital output of the sigma delta ADC, before decimation, shown as the output of sampler 190 in FIG. 4. First at step 143 a static value is detected, in other words the lack of change in digital output is detected. Next at 144, a time since the last change in value is determined, that is, the period from the last static value to the current static value is calculated. At 145 the detector determines whether there is a characteristic or common period between the changes, a period which reoccurs relatively frequently. A characteristic period indicates there is an interferer present. This can be used to trigger an increase in amount of channel filtering to reduce the impact of the interferer. Or an increase in filtering can be made dependent also on wanted signal strength. If desired, the frequency of the interferer can be determined, to enable the filter to be adapted appropriately. This can involve for example making the mid and high power outputs 91, 92 of the detector dependent on there being no interferer detected, or on the level and frequency of a detected interferer. The frequency is approximately the equal to 1/period. This value can be output to the filter adaptation control. This can be used to alter the filter coefficients for example to alter pass band frequencies or roll off rates for example.

An example of a program used to implement the steps shown in FIG. 7 and work out what the periods between static output sequences are, can be structured as follows. It can use the well known MATLAB language or other commonly used languages. The following steps are described in general terms not using a specific computer language.

Step 1: Load a previous sigma delta over sampled digital output.

Step 2: Load a current output.

Step 3: Compare current to previous output to see if output is static.

Step 4: If so, start a counter counting how many samples the output of the ADC stays static.

Step 5: If it stays constant for say 5 identical samples, start a period counter counting the number of samples of the period.

Step 6: Stop this period counter after the signal ceases to be constant and another constant period is detected.

Step 7: Repeat steps 2 to 6 to build a profile of the number of occurrences of different periods (such as the histograms of FIGS. 9 and 11).

Step 8: Compare a peak of the profile to a predetermined threshold.

Step 9: If threshold is exceeded over a given time period, deduce a periodic interferer is present, and derive its power level from number of occurrences, and its frequency from the period of the peak.

In practice, these steps can be implemented in logic in an ASIC or FPGA for example, or in a processor arranged to execute software written in a standard language for example.

Figure 8:
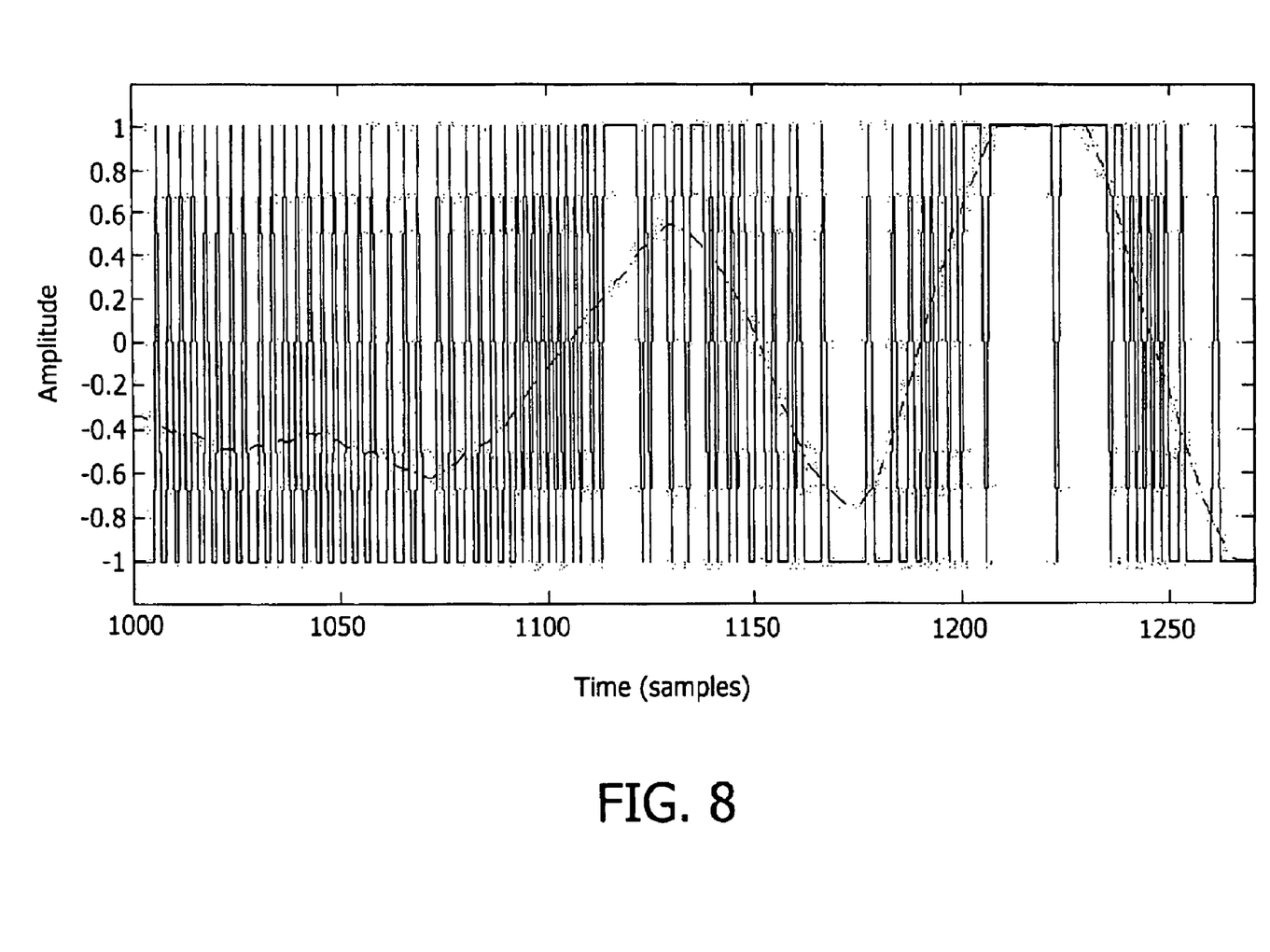
FIGS. 8 to 11 show graphs of the inputs and outputs of the modulator of the sigma delta ADC.
Figure 9:
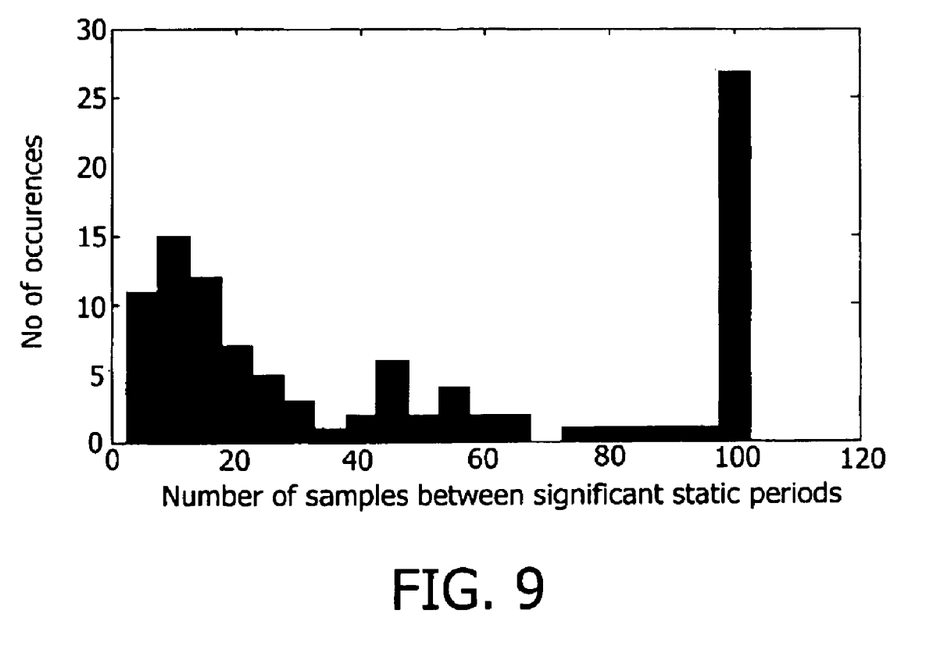

FIGS. 8 and 9 show graphs of outputs of an example using a sigma delta ADC in UMTS mode running at 153.6 MHz. FIG. 8 shows two lines, the analogue input to the sigma delta (broken line) and the digital sigma delta output (solid line). The scale along the bottom gives the sample time for the sigma delta output. This is for the case where there is a large wanted signal. The output of the sigma delta is fairly random with no easily identifiable pattern.

FIG. 9 shows a histogram for the same example which shows the measured period between significant flat patches of the sigma delta output. There is no significant peak for periods below 100 samples. The peak at 100 samples is a frequency sufficiently far from zero to be outside the range of interest. This assumes that for a receiver, the wanted frequencies are the lowest frequencies, which is the case for a zero I.F. type arrangement.

Figure 10:
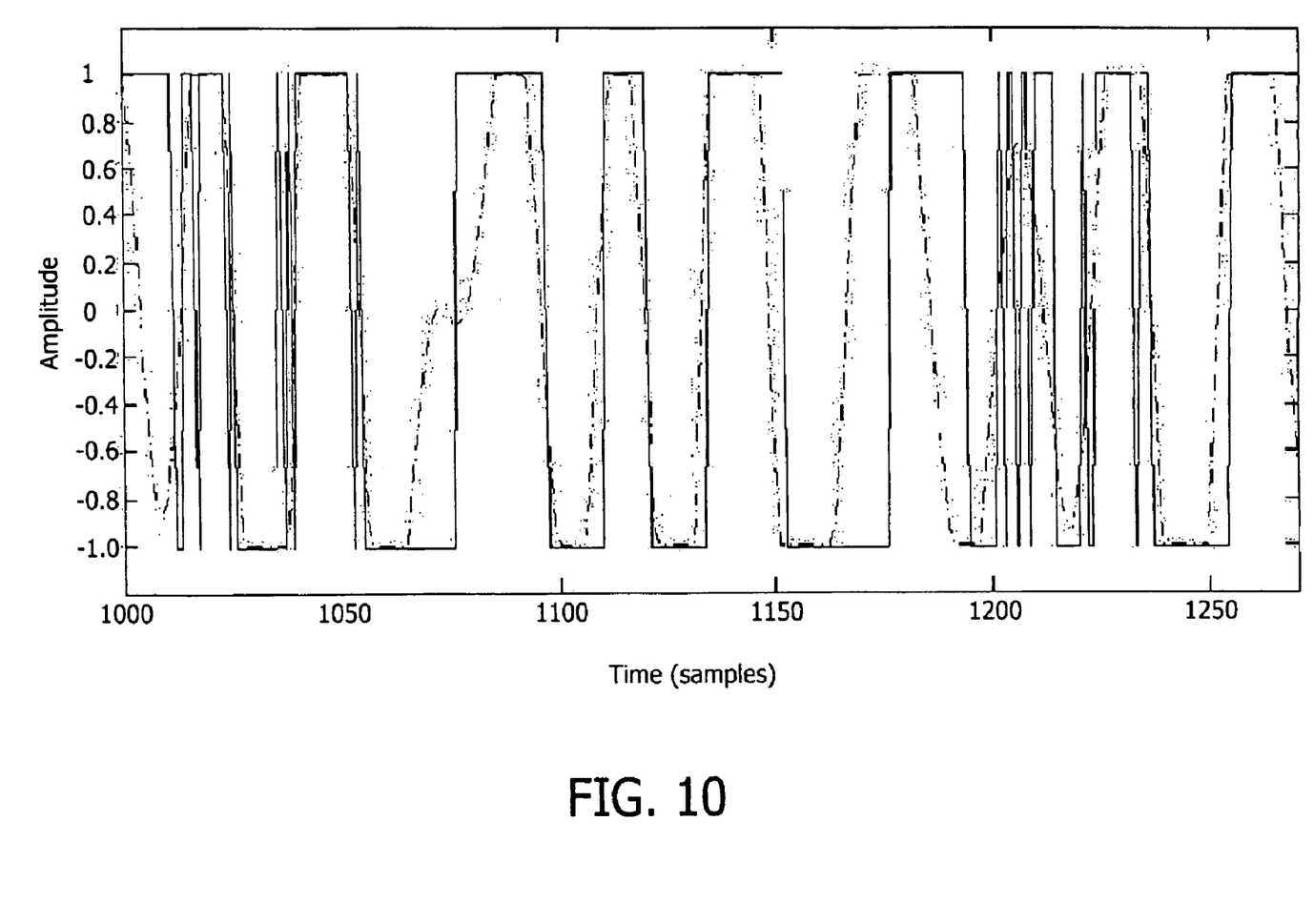
Figure 11:
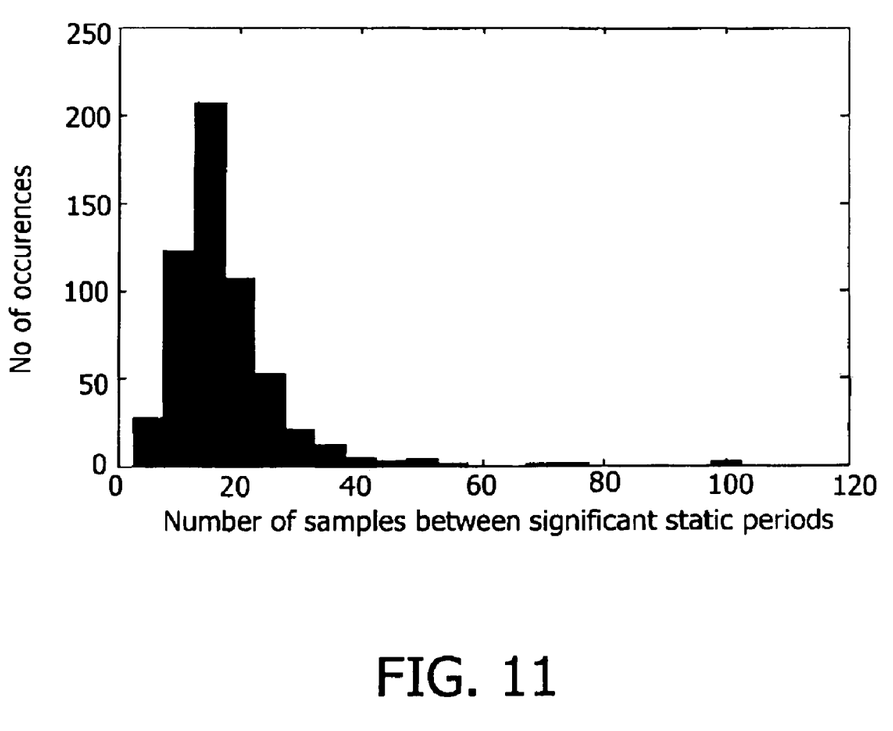

FIG. 10 is a graph similar to that of FIG. 8, but for the case of an input signal which is dominated by a 5 MHz modulated interferer (i.e. another UMTS channel). In this case a square wave begins to appear. The frequency of this square wave is related to the frequency of the interferer. FIG. 11 shows the histogram of frequency of each period between output changes, for the case of FIG. 10. Comparing the two histograms shows that there is a significant difference between the two situations and this difference can be used to detect the presence or absence of a large wanted/interferer. Also the frequency of the interferer can be estimated by looking at where the peak of the histogram lies.

The advantages are relevant for many sigma delta ADC applications. Its advantage of saving power means it is relevant to battery powered or mobile applications such as cellular mobile receivers in particular.

In conclusion, as has been described above, a receiver uses a sigma delta ADC and an adaptable digital filter. Detector circuitry detects information about unwanted parts of the signal from an oversampled digital signal, before the filtering, and feeds forward the detected information to the filter, to adapt the filter. By feeding forward the detection information, rather than feeding back an output of the filter, the adaptation can respond much more quickly to rapid changes in the unwanted interference. This enables reduced filtering to save power when interference is low, without risking a sudden increase in interference causing an avalanche of errors before the filter can be adapted correctly. The filter receives the oversampled digital signal combines decimation and channel filtering in one stage. Other variations and examples within the scope of the claims will be apparent to those skilled in the art.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of analogue to digital conversion circuits and applications using such circuits and which may be used instead of or in addition to features already described herein.

The invention claimed is:

1. A circuit comprising an analogue to digital converter ADC for converting an input signal to a digital signal, an adaptable digital filter for filtering the digital signal, a detector for detecting information about an unwanted part of the input signal, from the input signal or from the digital signal before the filter, the detector comprising circuitry for determining a frequency of the unwanted part, and means for feeding forward the detected information to the filter, the filter being arranged to adapt according to the information, the analogue to digital converter ADC comprising a noise shaping circuit, and the detector being arranged to use an output of the noise shaping circuit.

2. The circuit of claim 1, the input signal comprising multiple channels, and the digital filter comprising a channel filter for selecting a desired channel.

3. The circuit of claim 2, the analogue to digital converter ADC comprising a sigma delta ADC having a modulator for outputting an oversampled digital signal, and a decimator.

4. The circuit of claim 3, the digital filter being arranged to receive the oversampled digital signal and combine the ADC decimator operation and the channel filter operation.

5. The circuit of claim 3, the detector being arranged to detect the unwanted part of the signal from the oversampled digital signal.

6. The circuit of claim 5, the detector being arranged to detect a frequency that a number of sequences appear in the oversampled digital signal, corresponding to the unwanted part.

7. The circuit of claim 1, the adaptable digital filter being arranged to adapt any of filter order, filter coefficients, and quantisation level.

8. The circuit of claim 1, the noise shaping circuit comprising two or more series coupled integrator stages, outputs of two or more of the stages being coupled to the detector.

9. The circuit of claim 8, the detector comprising circuitry for combining the outputs of the two or more stages so as to give more weight to a preceding one of the stages.

10. An integrated circuit having the circuit of claim 1.

11. A mobile battery powered device having the circuit of claim 1.

12. A circuit comprising an analogue to digital converter ADC for converting an input signal to a digital signal, an adaptable digital filter for filtering the digital signal, a detector for detecting information about an unwanted part of the input signal, from the input signal or from the digital signal before the filter, and means for feeding forward the detected information to the filter, the filter being arranged to adapt according to the information, the analogue to digital converter ADC comprising a noise shaping circuit, and the detector being arranged to use an output of the noise shaping circuit, the input signal comprising multiple channels, and the digital filter comprising a channel filter for selecting a desired channel, the analogue to digital converter ADC comprising a sigma delta ADC having a modulator for outputting an oversampled digital signal, and a decimator, the detector being arranged to detect the unwanted part of the signal from the oversampled digital signal, the detector being arranged to detect a frequency that a number of sequences appear in the oversampled digital signal, corresponding to the unwanted part.

13. The circuit of claim 12, the digital filter being arranged to receive the oversampled digital signal and combine the ADC decimator operation and the channel filter operation.

14. The circuit of claim 12, the detector comprising circuitry for determining information about wanted and unwanted parts of the input signal, and the digital filter being adaptable according to a comparison of the information about the wanted and unwanted parts.

15. The circuit of claim 14, the digital filter being arranged to carry out a reduced amount of processing when the comparison indicates a strong signal, than when the comparison indicates a weaker signal.

16. A circuit comprising an analogue to digital converter ADC for converting an input signal to a digital signal, an adaptable digital filter for filtering the digital signal, a detector for detecting information about an unwanted part of the input signal, from the input signal or from the digital signal before the filter, means for feeding forward the detected information to the filter, the filter being arranged to adapt according to the information, the analogue to digital converter ADC comprising a noise shaping circuit, and the detector being arranged to use an output of the noise shaping circuit, the noise shaping circuit comprising two or more series coupled integrator stages, outputs of two or more of the stages being coupled to the detector.

17. The circuit of claim 16, the detector comprising circuitry for combining the outputs of the two or more stages so as to give more weight to a preceding one of the stages.

18. The circuit of claim 16, further comprising circuitry arranged to demodulate a signal operable according to the information.

19. The circuit of claim 16, the detector comprising circuitry for determining a frequency of the unwanted part.

20. The circuit of claim 16, the input signal comprising multiple channels, and the digital filter comprising a channel filter for selecting a desired channel.

* * * * *